US010116528B2

United States Patent
Raney

(10) Patent No.: US 10,116,528 B2
(45) Date of Patent: Oct. 30, 2018

(54) DIRECT NETWORK TRAFFIC MONITORING WITHIN VM PLATFORMS IN VIRTUAL PROCESSING ENVIRONMENTS

(71) Applicant: IXIA, Calabasas, CA (US)

(72) Inventor: Kristopher Raney, Austin, TX (US)

(73) Assignee: Keysight Technologies Singapore (Holdings) Pte Ltd, Singapore (SG)

( * ) Notice: Subject to any disclaimer, the term of this patent is extended or adjusted under 35 U.S.C. 154(b) by 102 days.

(21) Appl. No.: 14/873,896

(22) Filed: Oct. 2, 2015

(65) Prior Publication Data

US 2017/0099195 A1  Apr. 6, 2017

(51) Int. Cl.
*H04L 12/26*  (2006.01)
*H04L 12/46*  (2006.01)

(52) U.S. Cl.
CPC ........ *H04L 43/028* (2013.01); *H04L 12/4633* (2013.01)

(58) Field of Classification Search
CPC ............. G06F 9/45558; G06F 9/45533; G06F 2009/45562; G06F 2009/45595; G06F 2009/45591; H04L 12/4633; H04L 43/12; H04L 63/1425; H04L 63/306; H04L 43/028
See application file for complete search history.

(56) References Cited

U.S. PATENT DOCUMENTS

| | | |
|---|---|---|
| 5,515,376 A | 5/1996 | Murthy et al. |
| 6,321,259 B1 | 11/2001 | Oullette et al. |
| 6,578,147 B1 | 6/2003 | Shanklin et al. |
| 6,785,286 B1 | 8/2004 | O'Keeffe et al. |
| 6,839,349 B2 | 1/2005 | Ambe et al. |
| 6,853,623 B2 | 2/2005 | Nederveen et al. |

(Continued)

FOREIGN PATENT DOCUMENTS

WO  WO2016/053666 A1  4/2016

OTHER PUBLICATIONS

Search Report and Written Opinion, PCT/US2016/052589; dated Nov. 18, 2016, 13 pgs.

(Continued)

*Primary Examiner* — Marsha D. Banks Harold
*Assistant Examiner* — Elton Williams

(57) ABSTRACT

Systems and methods are disclosed that provide direct network traffic monitoring within virtual machine (VM) platforms operating in virtual processing environments. The disclosed embodiments in part provide direct network packet monitoring through client packet monitor applications that run within client VM platforms to obtain packet traffic and to forward this traffic directly to tool packet monitor applications operating within tool VM platforms. Further, the tool VM platforms can receive multiple incoming streams of network packets from various client VM platforms, and these incoming streams can change over time due to changes in the number of client VM platforms running within the virtual processing environment. Preferably, the network packet streams are communicated using encapsulation tunnels and related encapsulation headers, such as GRE tunnels using GRE identifiers in related encapsulation headers. These tunnels can be used to selectively forward particular packet streams to particular destination tool VM platforms.

32 Claims, 8 Drawing Sheets

(56) References Cited

U.S. PATENT DOCUMENTS

| | | | |
|---|---|---|---|
| 6,901,517 B1 | 5/2005 | Redmore | |
| 6,920,112 B1 | 7/2005 | McCloghrie et al. | |
| 6,954,775 B1 | 10/2005 | Shanklin et al. | |
| 6,996,779 B2 | 2/2006 | Meandzija et al. | |
| 7,016,980 B1 | 3/2006 | Mayer et al. | |
| 7,027,437 B1 | 4/2006 | Merchant et al. | |
| 7,142,518 B2 | 11/2006 | Mitchell | |
| 7,143,196 B2 | 11/2006 | Rimmer et al. | |
| 7,254,114 B1 | 4/2007 | Turner et al. | |
| 7,245,620 B2 | 7/2007 | Shankar | |
| 7,310,306 B1 | 12/2007 | Cheriton | |
| 7,424,018 B2 | 9/2008 | Gallatin et al. | |
| 7,554,984 B2 | 6/2009 | Kalkunte et al. | |
| 7,688,727 B1 | 3/2010 | Ferguson et al. | |
| 7,769,873 B1 | 8/2010 | Mackie | |
| 7,889,711 B1 | 2/2011 | Minei et al. | |
| 7,917,647 B2 | 3/2011 | Cooper et al. | |
| 8,018,943 B1 | 9/2011 | Pleshek et al. | |
| 8,098,677 B1 | 1/2012 | Pleshek et al. | |
| 8,156,209 B1 | 4/2012 | Phadnis et al. | |
| 8,200,203 B1 | 6/2012 | Christensen et al. | |
| 8,447,718 B2 | 5/2013 | Norton et al. | |
| 8,842,548 B2 | 9/2014 | Pleshek et al. | |
| 8,902,895 B2 | 12/2014 | Pleshek et al. | |
| 8,914,406 B1 | 12/2014 | Haugsnes et al. | |
| 8,934,495 B1 | 1/2015 | Hilton et al. | |
| 9,075,642 B1* | 7/2015 | Chalmer | G06F 9/45533 |
| 9,110,703 B2 | 8/2015 | Santos et al. | |
| 9,680,728 B2 | 6/2017 | Besser | |
| 2001/0022786 A1 | 9/2001 | King et al. | |
| 2001/0055274 A1 | 12/2001 | Hegge et al. | |
| 2002/0186259 A1 | 12/2002 | Meandzija et al. | |
| 2003/0046657 A1 | 3/2003 | White | |
| 2003/0074421 A1 | 4/2003 | Kusano et al. | |
| 2004/0003094 A1 | 1/2004 | See | |
| 2004/0042470 A1 | 3/2004 | Cooper et al. | |
| 2004/0103321 A1 | 5/2004 | Wesinger, Jr. et al. | |
| 2004/0107361 A1 | 6/2004 | Redan et al. | |
| 2004/0196841 A1 | 10/2004 | Tüdor et al. | |
| 2005/0053073 A1 | 3/2005 | Kloth et al. | |
| 2005/0182950 A1 | 8/2005 | Son et al. | |
| 2006/0256788 A1 | 11/2006 | Donahue | |
| 2008/0008202 A1 | 1/2008 | Terrell et al. | |
| 2008/0072292 A1 | 3/2008 | Narjala | |
| 2008/0201455 A1 | 8/2008 | Husain | |
| 2008/0222731 A1 | 9/2008 | Dowd et al. | |
| 2009/0007021 A1 | 1/2009 | Hayton | |
| 2009/0013052 A1 | 1/2009 | Robarts et al. | |
| 2009/0150996 A1 | 6/2009 | Haswell | |
| 2009/0172148 A1 | 7/2009 | Underwood | |
| 2009/0238192 A1 | 9/2009 | Dolganow et al. | |
| 2009/0327903 A1 | 12/2009 | Smith et al. | |
| 2010/0017801 A1* | 1/2010 | Kundapur | G06F 9/45558 718/1 |
| 2010/0027554 A1 | 2/2010 | Kuthan et al. | |
| 2010/0332618 A1 | 12/2010 | Norton et al. | |
| 2011/0004698 A1* | 1/2011 | Wu | G06F 9/45558 709/235 |
| 2011/0317694 A1 | 12/2011 | Pleshek et al. | |
| 2012/0079107 A1 | 3/2012 | Williams et al. | |
| 2012/0106354 A1 | 5/2012 | Pleshek et al. | |
| 2013/0031233 A1 | 1/2013 | Feng et al. | |
| 2013/0291109 A1 | 10/2013 | Staniford et al. | |
| 2014/0229605 A1* | 8/2014 | Besser | H04L 43/12 709/224 |
| 2015/0263889 A1 | 9/2015 | Newton | |
| 2015/0319030 A1 | 11/2015 | Nachum | |
| 2015/0334628 A1* | 11/2015 | Jeong | H04L 12/6418 370/329 |
| 2016/0094418 A1 | 3/2016 | Raney | |
| 2016/0110211 A1 | 4/2016 | Karnes | |
| 2017/0083354 A1 | 3/2017 | Thomas et al. | |
| 2017/0099197 A1 | 4/2017 | Raney | |
| 2017/0163510 A1 | 6/2017 | Arora et al. | |
| 2017/0208037 A1 | 7/2017 | Hay et al. | |

OTHER PUBLICATIONS

S. Edwards, "Vulnerabilities of Network Intrusion Detection Systems: Realizing and Overcoming the Risks; The Case for Flow Mirroring," Top Layer Networks, Inc., May 1, 2002.

A. Esson and J. Mannos, "Broadcom BCM5600 StrataSwitch; A Highly Integrated Ethernet Switch on a Chip," Broadcom Corporation, Hot Chips Aug. 17, 1999.

J. Magee, "The Case for IDS Balancing vs. a Switch," Top Layer Networks, Inc., May 2003.

G. Marshall, SC Magazine Reprint, "Attack Mitigator," Aug. 2002.

F. Muhtar, "Appliances to Boost Network Defence," CyberSecurity Malaysia, Nov. 26, 2001.

National Information Assurance Partnership, "Common Criteria Evaluation and Validation Scheme, Validation Report; Top Layer Networks; IDS BalancerTM Version 2.2 Appliance (IDSB3531-CCV1.0, IDSB3532-CCV1.0, IDSB4508-CCV1.0)," Report No. CCEVS-VR-04-0074, National Institute of Standards and Technology; National Security Agency, Sep. 3, 2004.

Radware, "Radware's Smart IDS Management; FireProof and Intrusion Detection Systems; Deployment and ROI," North America Radware, Inc.; International Radware, Ltd., Aug. 21, 2002.

SC Magazine Reprint, "IDS Balancer 3500 Appliance," Jul. 2002.

Top Layer Networks, Inc., "Top Layer Advances Scaleable Intrusion Detection With Industry Leading Multi-Gigabit Offering," Press Release, Mar. 10, 2003.

Top Layer Networks, Inc., "Product Enhancements Optimize Existing Network Intrusion Detection and Prevention Environments," Press Release, Aug. 18, 2003.

Top Layer Networks, Inc., "Case Study—IDS Balancer; Building an Intelligent Monitoring Layer Using the Top Layer IDS Balancer Ensures Full Security Coverage for University of California, Irvine," www.TopLayer.com; 2003.

Top Layer Networks, Inc., "IDS Balancer 3.0 Delivers Ultimate Flexibility in Selecting, Filtering and Distributing Network Traffic," Press Release, Oct. 20, 2004.

Top Layer Networks, Inc., "IDS Balancer; Aggregation, Filtering, & Load Appliance," internet advertisement, www.TopLayer.com., 2004.

Top Layer Networks, Inc., "APP 2500; The Original Top Layer Device to Perfect the Switch Art of Network Security," internet advertisement, www.TopLayer.com. 2001.

Kristopher Raney, "Selective Scanning of Network Packet Traffic Using Cloud-Based Virtual Machine Tool Platforms," U.S. Appl. No. 14/501,717, filed Sep. 30, 2014.

Ixia, "A Paradigm Shift for Network Visibility: Delivering Better Data for Better Decisions", Rev. A. May 2014, 14 pgs.

Ixia, "Ixia Application and Threat Intelligence Processor", Data Sheet, May 2014, 3 pgs.

Ixia, "Ixia xFilter", Data Sheet, May 2015, 5 pgs.

Hofstede et al., "Flow Monitoring Explained: From Packet Capture to Data Analysis With NetFlow and IPFIX", IEEE, 31 pgs. (May 2014).

Ixia, Ixia Phantom vTap With TapFlow Filtering, Data Sheet, 4 pgs. (Jul. 2015).

Ixia, Ixia Flex Tap, Data Sheet, 5 pgs. (Oct. 2015).

Office Action dated Jul. 27, 2018, from Raney, "Network Traffic Pre-Classification Within VM Platforms in Virtual Processing Environments," U.S. Appl. No. 15/342,170, filed Nov. 3, 2016, 37 pages.

* cited by examiner

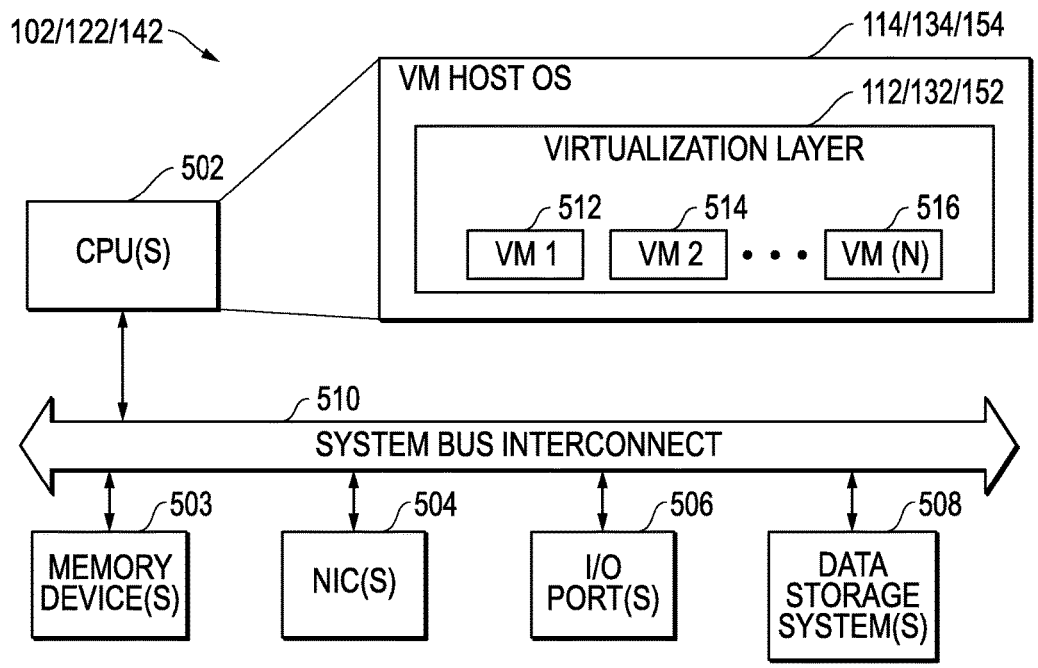
*FIG. 5*
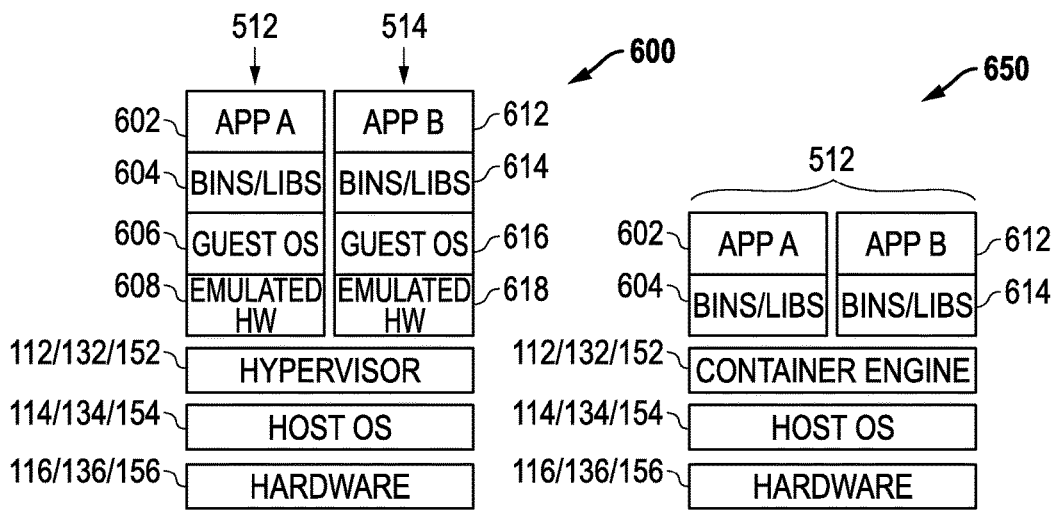
*FIG. 6A*   *FIG. 6B*

DIRECT NETWORK TRAFFIC MONITORING WITHIN VM PLATFORMS IN VIRTUAL PROCESSING ENVIRONMENTS

TECHNICAL FIELD OF THE INVENTION

This invention relates to monitoring packet flows for network communications and, more particularly, to monitoring such packet flows within virtual processing environments.

BACKGROUND

Packet-based data networks continue to grow in importance, and it is often desirable to monitor network traffic associated with these packet-based networks on an ongoing basis. To meet these monitoring needs, copies of network packets can be forwarded to diagnostic network monitoring tools. Packets are often forwarded using network hubs, test access ports (TAPs), and/or switched port analyzer (SPAN) ports available on network switch systems.

To help alleviate the problem of limited access to network packets for monitoring, tool aggregation devices or packet broker devices have also been developed that allow shared access to the monitored network packets. In part, these network packet broker devices allow users to obtain packets from one or more network monitoring points (e.g., network hubs, TAPs, SPAN ports, etc.) and to forward them to different monitoring tools. Network packet brokers can be implemented as one or more packet processing systems in hardware and/or software that provide access and visibility to multiple monitoring tools. These network packet brokers can also aggregate monitored traffic from multiple source links and can load balance traffic of interest to various tools. The traffic of interest can be network packets that are selected by the packet brokers through packet filters and related packet forwarding rules that identify particular packets or packet flows from within the monitored network traffic as traffic of interest.

Network packet analysis tools include a wide variety of devices that analyze packet traffic, including traffic monitoring devices, packet sniffers, data recorders, voice-over-IP monitors, intrusion detection systems, network security systems, application monitors, and/or other network tool devices or systems. Network analysis tools, such as traffic analyzers, are used within packet-based data networks to determine details about the network packet traffic flows within the packet communication network infrastructure.

Certain network communication systems also include virtual processing environments that include virtual machine (VM) platforms hosted by one or more VM host servers. For example, network applications and resources can be made available to network-connected systems as virtualized resources operating within virtualization layers for VM host servers. In some embodiments, processors or processing cores associated with a server processing platform (e.g., server blade) and/or combinations of such server processing platforms operate to provide instances or virtual machine platforms within the server processing platforms. A virtual machine (VM) platform is an emulation of a processing system or network application that is formed and operated within virtualization layer software being executed on a VM host hardware system. By operating multiple VM platforms within such a virtualization layer also operating on VM host hardware system, a variety of processing resources can be provided internally to the virtual processing environment and/or externally to other network-connected processing systems and devices.

When a network to be monitored includes virtual processing environments, however, difficulties arise in obtaining packet traffic from network communications for VM platforms operating within such virtual processing environments. One prior solution includes a TAP application that runs within a virtualization layer, such as hypervisor, for a virtual processing environment. This TAP application forwards packets to an external network-connected packet broker device using GRE (generic routing encapsulation) tunnels. For these GRE tunnels, GRE identifiers are added to encapsulation headers for the packets, and the external packet broker device removes the GRE headers from the packets and forwards the packets to external monitoring tools. This prior solution, however, requires installation of the TAP application in the virtualization layer of the virtual processing environment, which creates significant security issues where multiple different users are operating VM platforms within a VM host server that each communicate network packets through the virtualization layer. For example, a virtual switch operating in the virtualization layer may receive packets from VM platforms from multiple different users, and it can be difficult for the TAP application to segregate such packet traffic within the virtualization layer.

SUMMARY OF THE INVENTION

Systems and methods are disclosed that provide direct network traffic monitoring within virtual machine (VM) platforms operating in virtual processing environments. The disclosed embodiments in part provide direct network packet monitoring through client packet monitor applications that run within client VM platforms to obtain packet traffic and to forward this traffic directly to tool packet monitor applications operating within tool VM platforms. Further, the tool VM platforms can receive multiple incoming streams of network packets from various client VM platforms, and these multiple incoming streams can change over time due to changes in the number of client VM platform instances that are running within the virtual processing environment. Preferably, the network packet streams are communicated using encapsulation tunnels and related encapsulation headers, such as GRE tunnels using GRE identifiers in related encapsulation headers. Further, these tunnels can be used to selectively forward particular packet streams to particular destination tool VM platforms. Other features and variations can be implemented, if desired, and related systems and methods can be utilized, as well.

For one embodiment a method to monitor packet traffic is disclosed including generating network packets using one or more client applications operating within a client virtual machine (VM) platform operating within a first VM host server, obtaining copies of the network packets to generate network packet copies, encapsulating the network packet copies with encapsulation headers to form encapsulated network packet copies, and forwarding the encapsulated network packet copies to a tool VM platform operating within a second VM host server, where the obtaining, encapsulating, and forwarding are performed by a client packet monitor application operating within the client VM platform.

In another embodiment, the method further includes using the client packet monitor application to filter the network packet copies with one or more packet filters prior to the encapsulating. In further embodiments, the method also includes receiving configuration information for the one or more packet filters from a traffic management VM platform operating within a third VM host server.

In another embodiment, the method further includes receiving the encapsulated network packet copies with a tool packet monitor application operating within the tool VM platform. In further embodiments, the method also includes using the tool packet monitor application to de-encapsulate the encapsulated network packet copies to form client traffic and to forward the client traffic to one or more tool applications operating within the tool VM platform.

In another embodiment, the encapsulating includes encapsulating the network packet copies with GRE (general routing encapsulation) headers. In further embodiments, the GRE headers include GRE identifiers that identify destination tool applications within the tool VM platform to receive the network packet. In still further embodiments, the method also includes receiving GRE identifiers from a traffic management VM platform operating within a third VM host server. In additional embodiments, a single common VM server serves as the first VM server, the second VM server, and the third VM server.

In another embodiment, the method further includes operating a first hypervisor within the first VM host server to provide a first virtualization layer for the client VM platform and a corresponding first guest operating system, and operating a second hypervisor within the second VM host server to provide a second virtualization layer for the tool VM platform and a corresponding second guest operating system. In other embodiments, the method further includes operating a first container engine within the first VM host server to provide a first virtualization layer for the client VM platform without a corresponding guest operating system, and operating a second container engine within the second VM host server to provide a second virtualization layer for the tool VM platform without a corresponding guest operating system.

In another embodiment, the method further includes initiating a new client VM platform operating within the first VM host server and configuring a client packet monitor application for the new client VM platform using configuration information received from a traffic management VM platform. In other embodiments, the method further includes initiating a new tool VM platform operating within the second VM host server and configuring a tool packet monitor application for the new tool VM platform using configuration information received from a traffic management VM platform.

In another embodiment, network packets are generated by a plurality of client VM platforms operating within the first VM host server where each has a client packet monitor application preforming the obtaining, encapsulating, and forwarding; and the method further includes sending forwarding instructions to each of the client packet monitor applications to determine how encapsulated network packets copies are forwarded to a plurality of different tool VM platforms operating within the second VM host server.

For one embodiment, a system to monitor packet traffic is disclosed including a first virtual machine (VM) host server configured to host one or more client applications operating within a client virtual machine (VM) platform where the one or more client applications are configured to generate network packets and a second VM host server configured to host a tool VM platform. In addition, the first VM host server is further configured to host a client packet monitor application, and the client packet monitor application is configured to obtain copies of the network packets to generate network packet copies, to encapsulate the network packet copies with encapsulation headers to form encapsulated network packet copies, and to forward the encapsulated network packet copies to the tool VM platform.

In another embodiment, the client packet monitor application is further configured to filter the network packet copies with one or more packet filters prior to the encapsulating. In further embodiments, the system includes a third VM server configured to host a traffic management VM platform, and configuration information for the one or more packet filters includes information received from the traffic management VM platform.

In another embodiment, the second VM server is configured to host a tool packet monitor application, and the tool packet monitor application is configured to receive the encapsulated network packet copies. In further embodiments, the tool packet monitor application is further configured to de-encapsulate the encapsulated network packet copies to form client traffic and to forward the client traffic to one or more tool applications operating within the tool VM platform.

In another embodiment, encapsulation headers for the network packet copies include GRE (general routing encapsulation) headers. In further embodiments, the GRE headers include GRE identifiers that identify destination tool applications within the tool VM platform to receive the network packet. In still further embodiments, the system further includes a third VM server configured to host a traffic management VM platform, and the GRE identifiers include GRE identifiers received from the traffic management VM platform. In additional embodiments, a single common VM server serves as the first VM server, the second VM server, and the third VM server.

In another embodiment, the first VM host server is further configured to host a first hypervisor to provide a first virtualization layer for the client VM platform and a corresponding first guest operating system, and the second VM host server is further configured to host a second hypervisor to provide a second virtualization layer for the tool VM platform and a corresponding second guest operating system. In other embodiments, the first host VM server is further configured to host a first container engine to provide a first virtualization layer for the client VM platform without a corresponding guest operating system, and the second host VM server is further configured to host a second container engine to provide a second virtualization layer for the tool VM platform without a corresponding guest operating system.

In another embodiment, the first VM host server is configured to initiate a new client VM platform having a client packet monitor application using configuration information received from a traffic management VM platform. In other embodiments, the second VM host server is further configured to initiate a new tool VM platform having a tool packet monitor application using configuration information received from a traffic management VM platform.

In another embodiment, the first VM host server is configured to host a plurality of client VM platforms where each is configured to have a client packet monitor application, and the client packet monitor applications are configured to receive forwarding instructions to determine how encapsulated network packets copies are forwarded to a plurality of different tool VM platforms operating within the second VM host server.

Different or additional features, variations, and embodiments can be implemented, if desired, and related systems and methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

FIG. 5 is a block diagram of an example embodiment for a VM host server.

FIG. 6A is a block diagram of an example embodiment for a VM host server that uses a hypervisor to provide a virtualization layer.

FIG. 6B is a block diagram of an example embodiment for a VM host server that uses a container engine to provide a virtualization layer.

DETAILED DESCRIPTION OF THE INVENTION

Systems and methods are disclosed that provide direct network traffic monitoring within virtual machine (VM) platforms operating in virtual processing environments. The disclosed embodiments in part provide direct network packet monitoring through client packet monitor applications that run within client VM platforms to obtain packet traffic and to forward this traffic directly to tool packet monitor applications operating within tool VM platforms. Further, the tool VM platforms can receive multiple incoming streams of network packets from various client VM platforms, and these multiple incoming streams can change over time due to changes in the number of client VM platform instances that are running within the virtual processing environment. Preferably, the network packet streams are communicated using encapsulation tunnels and related encapsulation headers, such as GRE tunnels using GRE identifiers in related encapsulation headers. Further, these tunnels can be used to selectively forward particular packet streams to particular destination tool VM platforms. Different features and variations can also be implemented, as desired, and related systems and methods can be utilized, as well.

In operation, the disclosed embodiments operate a client packet monitor application including a virtual TAP (test access port) internally within each client VM platform rather than in a virtualization layer or in external network infrastructure. The virtual TAP obtains copies of client traffic, and this copied client traffic is then tunneled to selected destination tools. The tunneled monitor traffic can be communicated through existing network communication paths and effectively becomes an overlay for the traffic already within network environment. As described herein, this visibility traffic can be tunneled directly to monitoring tool applications operating within tool VM platforms, and the tunnels are terminated and forwarded to tool applications inside each tool VM platform using a tool packet monitor application. As further described herein, configuration of the client/tool packet monitor applications is preferably managed centrally by a traffic management VM platform, and newly created instances of the packet monitor applications can immediately download configuration information from the traffic management VM platform at startup without any need for user intervention. For certain embodiments, the packet monitor applications are installed as virtual applications that run on hypervisors using corresponding guest operating systems. For other embodiments, the client packet monitor applications are installed as container applications that run on container engines without need for guest operating systems. Other variations can also be implemented while still taking advantage of the direct VM packet traffic monitoring techniques described herein.

Figure 7A:
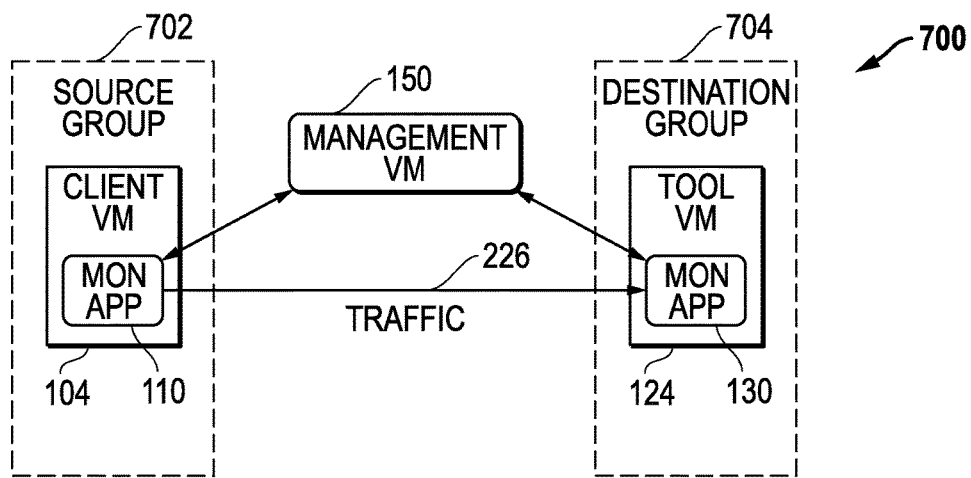
FIG. 7A is a block diagram of an example embodiment for an initial monitoring environment.
Figure 7B:
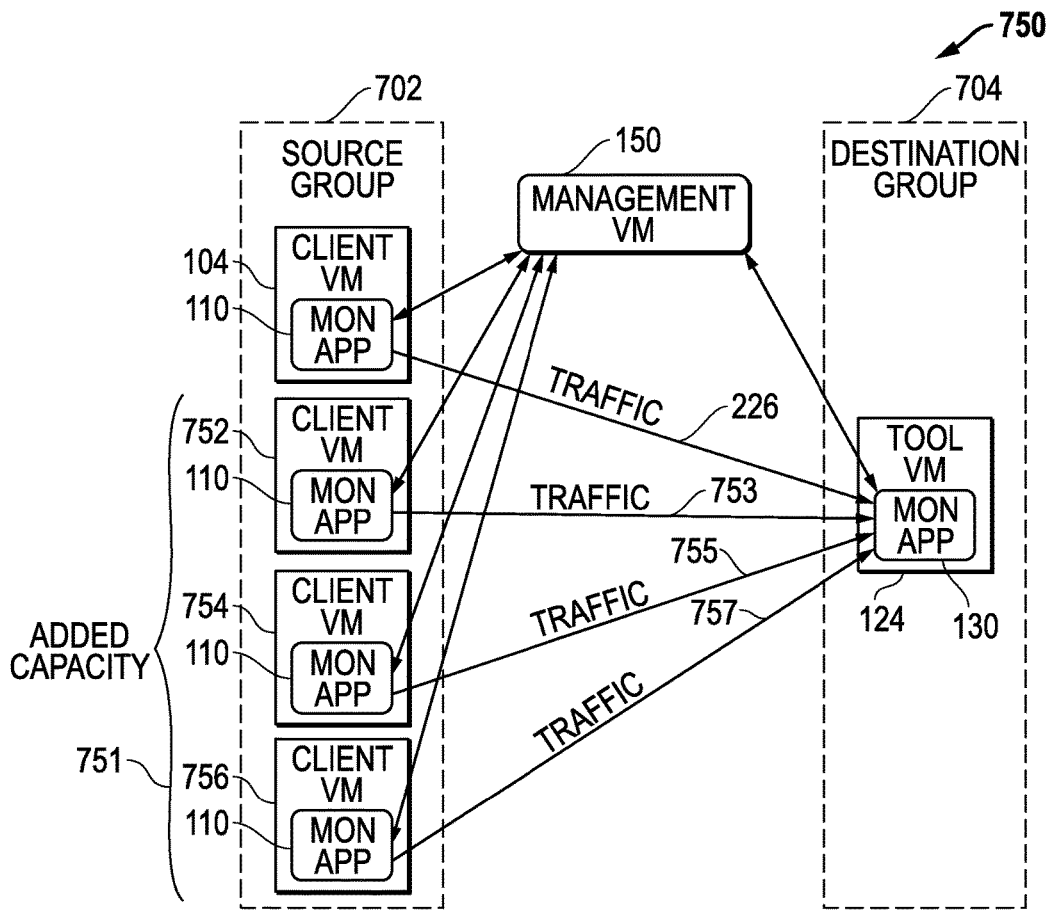
FIG. 7B is a block diagram of an example embodiment for a monitoring environment where additional client VM platform processing capacity has been added to the embodiment of FIG. 7A.
Figure 8:
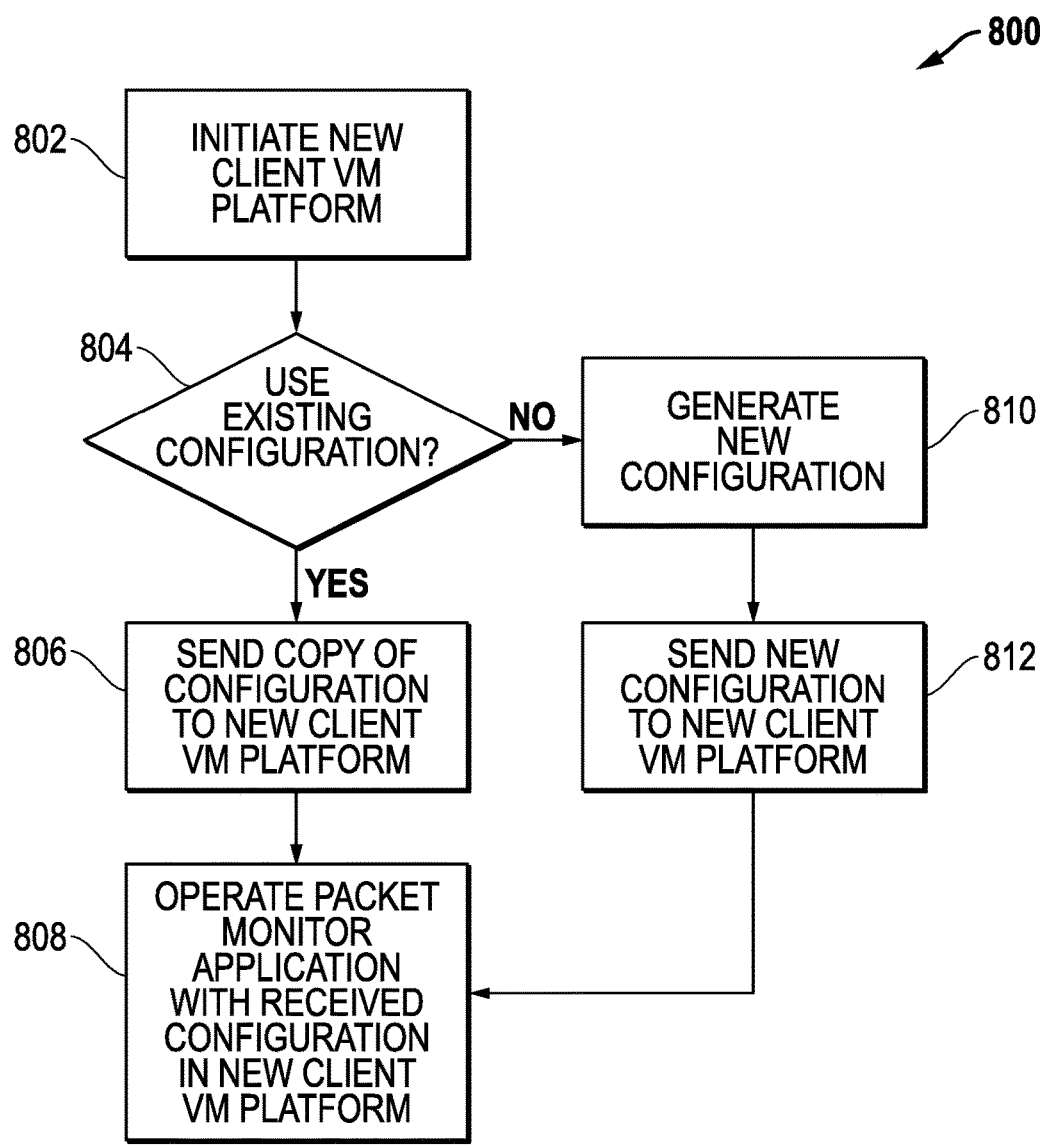
FIG. 8 is a process flow diagram of an example embodiment where a traffic management VM platform is used to provide automatic configuration of client packet monitor applications within new client VM platforms.
Figure 9:
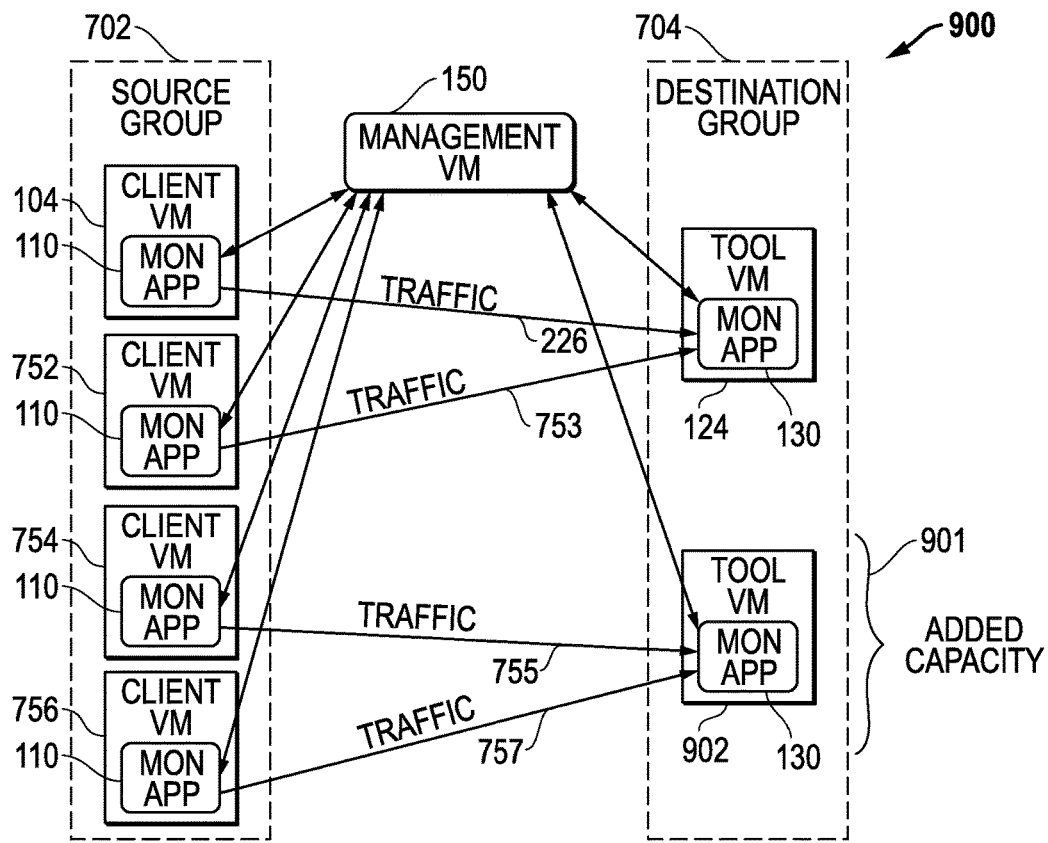
FIG. 9 is a block diagram of an example embodiment for a monitoring environment where additional tool VM platform processing capacity has been added.
Figure 10:
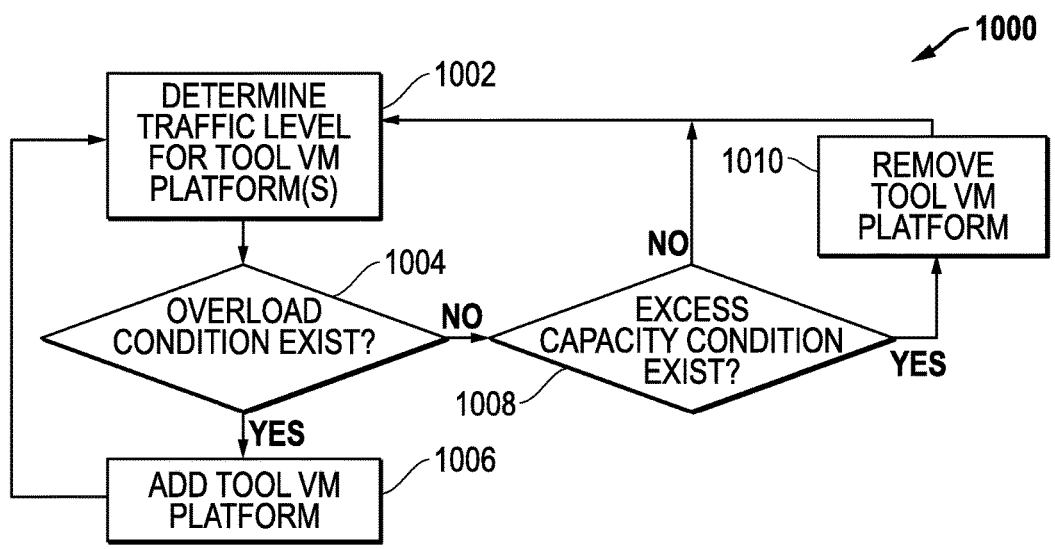
FIG. 10 is a process flow diagram of an example embodiment where tool VM platforms are adjusted based upon current capacity needs.

Example embodiments are new described in more detail with respect to the drawings. FIGS. 1-4 provide example embodiments for virtual processing environments where a traffic management VM platform manages client/tool packet monitor applications operating internally to client VM platforms and tool VM platforms to provide for packet traffic monitoring. FIG. 5 provides an example embodiment for a VM host server. FIGS. 6A-B provide example embodiments for a hypervisor solution and container engine solution for different virtual processing environments. FIGS. 7A-B and 8 provide example embodiments for auto-configuration of client packet monitor applications within new client VM platforms using a traffic management VM platform. FIGS. 9-10 provide example embodiments for auto-configuration of tool packet monitor applications within new tool VM platforms using a traffic management VM platform. It is further noted that other variations and features can also be implemented while still taking advantage of the direct VM packet traffic monitoring techniques described herein.

Figure 1:
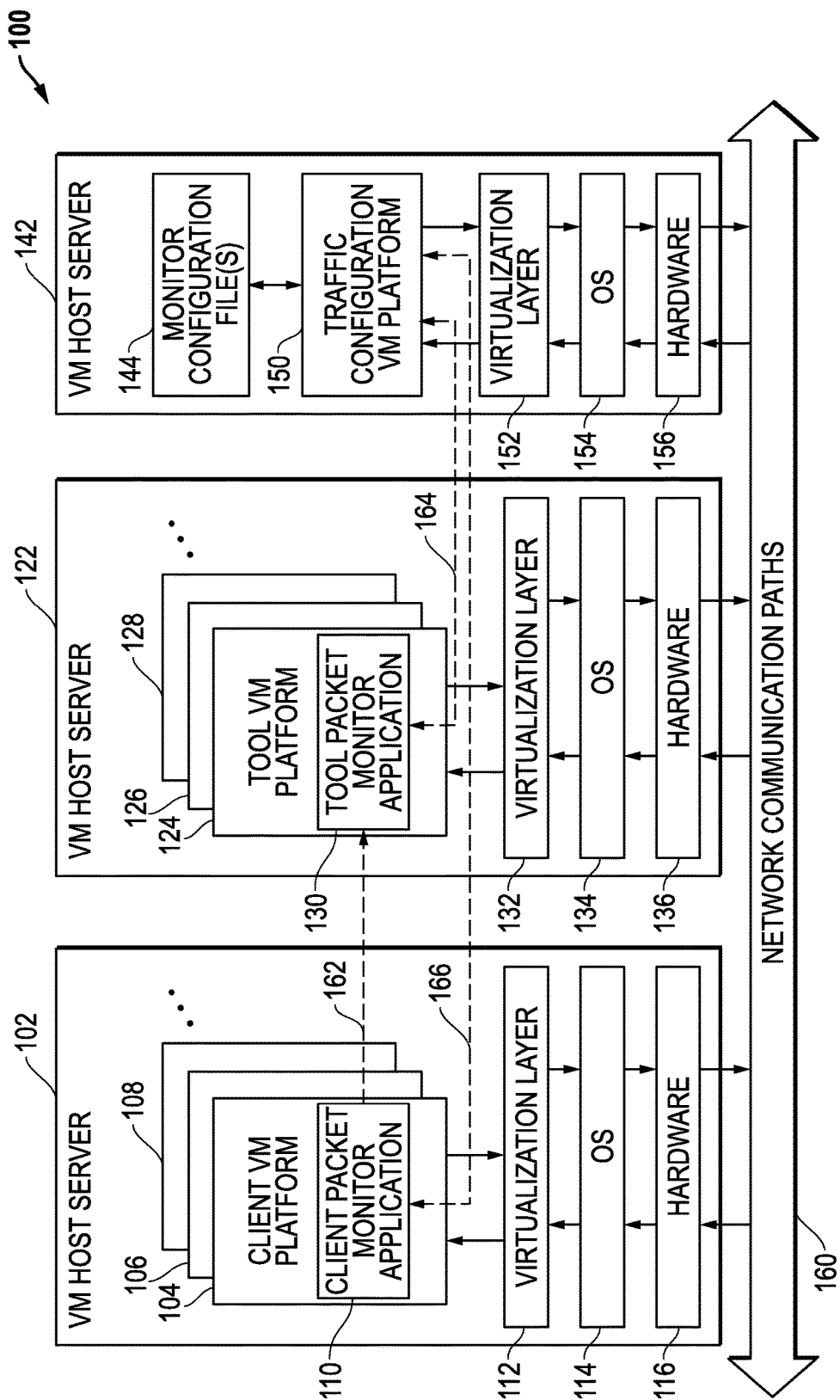
FIG. 1 is a block diagram of an example embodiment for a traffic monitoring environment including a traffic management virtual machine (VM) platform configured to manage client/tool packet monitor applications operating within VM platforms on VM host servers.

FIG. 1 is a block diagram of an example embodiment 100 for a traffic monitoring environment including a traffic management VM platform 150 on host server 142 configured to manage packet monitor applications 110/130 operating within VM platforms on VM host servers 102 and 122. For the example embodiment depicted, one or more client VM platforms 104, 106, 108 . . . operate within a first VM host server 102; one or more tool VM platforms 124, 126, 128 . . . operate within a second VM host server 122; and a traffic management VM platform 150 operates within a third VM host server 142. The host VM servers 102, 122, and 142 are configured to communicate with each other through one or more external network communication paths 160. The external network communication paths 160 can included wired network communication paths, wireless network communication paths, or a combination of wired and wireless communication paths, and the external network communication paths 160 can include one or more intervening network communication devices or systems within a network communication infrastructure. Further, one or more different communication protocols can be used within the network communication paths 160 to communicate network packets within the network communication paths 160.

Looking to VM host server 102, the client VM platforms 104, 106, 108 . . . operate within a virtualization layer 112 that operates on top of an operating system (OS) 114 which in turn operates on computer hardware 116. The computer hardware 116 is coupled to communicate with the network communication paths 160, for example, through one or more network interface cards and/or other network connections. The client VM platforms 104, 106, 108 . . . can be configured, for example, to operate in part to provide one or more network applications that communicate packets through the external network communication paths 160 and/or with each other. As represented by client VM platform 104, each of the client VM platforms 104, 106, 108 . . . includes a client packet monitor application 110. As described herein, the client packet monitor application 110 operates to monitor packet traffic within the client VM platform 104 and to forward copies of this packet traffic to one or more of the tool VM platforms 124, 126, 128 . . . within one or more VM host servers as represented by dashed arrow 162.

Looking to VM host server 122, the tool VM platforms 124, 126, 128 . . . operate within a virtualization layer 132 that operates on top of an operating system (OS) 134 which in turn operates on computer hardware 136. The computer hardware 136 is coupled to communicate with the network communication paths 160, for example, through one or more network interface cards and/or other network connections. The tool VM platforms 104, 106, 108 . . . can be configured, for example, to operate in part to provide one or more network packet analysis tool applications that analyze received packets. As represented by tool VM platform 124, each of the tool VM platforms 124, 126, 128 . . . includes a tool packet monitor application 130. As described herein, the tool packet monitor application 130 within each tool VM platform 124, 126, 128 . . . operates to receive monitored packet traffic from one or more of the client packet monitor applications 110 within the client VM platforms 104, 106, 108 . . . and to provide this monitored traffic for further processing by tool applications also operating within the tool VM platforms 124, 126, 128 . . . along with the tool packet monitor application 130.

Looking to VM host server 142, the traffic management VM platform 150 operates within a virtualization layer 152 that operates on top of an operating system (OS) 154 which in turn operates on computer hardware 156. The computer hardware 156 is coupled to communicate with the network communication paths 160, for example, through one or more network interface cards and/or other network connections. The traffic management VM platform 150 can be configured, for example, to initialize, control, and/or otherwise manage the client VM monitor application(s) 110 and the tool packet monitor application(s) 130 as represented by dashed lines 164 and 166. For example, the traffic management VM platform 150 can use one or more monitor configuration files 144 to initialize, configure, and/or otherwise manage the client packet monitor applications 110 and the tool packet monitor applications 130.

It is noted that while the client VM platforms 104, 106, 108 . . . are shown as operating within a single VM host server 102, these client VM platforms could also be distributed among multiple VM host servers. Similarly, while the tool VM platforms 124, 126, 128 . . . are shown as operating within VM host server 122, these tool VM platforms could also be distributed among multiple VM host servers. In addition, while the traffic management VM platform 150 is shown as operating within a single VM host server 142, multiple traffic management VM platforms could be provided and could be distributed among a plurality of VM host servers. Further, client VM platforms, tool VM platforms, and/or traffic management VM platforms can also be included within a common VM host server. As such, the various VM platforms for embodiment 100 can be distributed as desired among various VM host servers.

Figure 2:
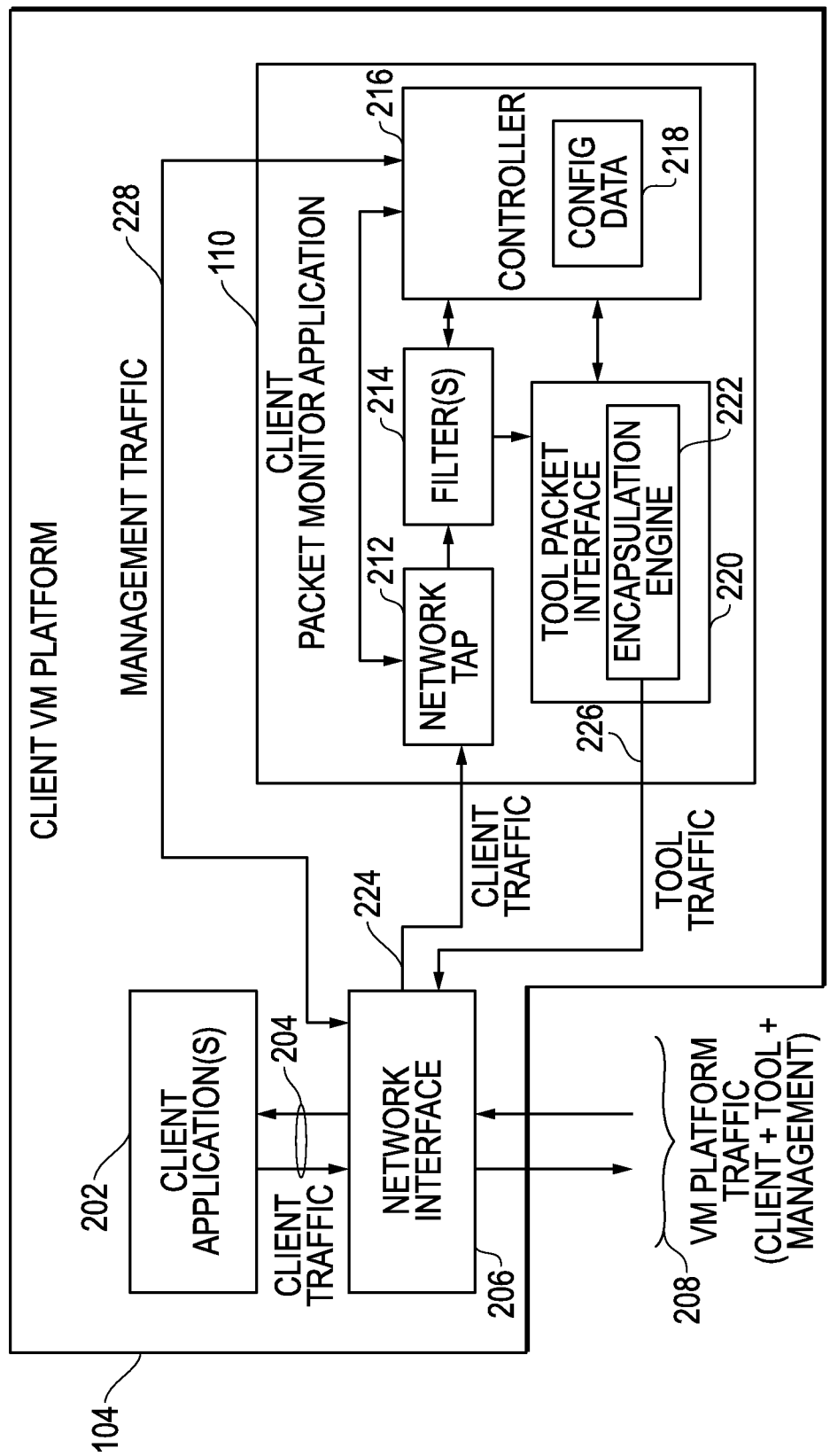
FIG. 2 is a block diagram of an example embodiment for a client VM platform that includes a client packet monitor application.

In operation, installing tap functionality through the client packet monitor applications 110 within each of the client VM platforms 104, 106, 108 . . . has a number of advantages. For example, scaling is handled implicitly as the client packet monitor applications will scale directly with the scaling of the client VM platforms. New client VM platform instances will include the client packet monitor application, and any reduction in the number of client VM platform instances will also remove any client packet monitor applications running in those client VM platform instances. In addition, by being inside the client VM platform, the client packet monitor applications 110 are also behind any load balancer feeding packets to the client VM platforms thereby allowing for any prior load balancing to still be effective. Security is also improved and new risks are not introduced because packet security protections can remain unchanged as packets are obtained at the operating (OS) level and are obtained within a user's own network application context. Further, from inside the client VM platforms 104, 106, 108 . . . , the client packet monitor applications 110 have access to metadata that is outside the contents of the packet itself allowing for a broader basis for high-level forwarding configurations. For example, packet collection or filtering decisions can be made on the basis of operating system (OS), platform metadata, processing metrics (e.g., CPU load), and/or desired information apart from the packets contents themselves. Further examples of information outside the packet contents, which can be used to configure client/tool packet monitor applications and/or to generate filter configurations, include hardware architectures (e.g., number of processors, types of processors, numbers of network interfaces, types of network interfaces), hardware metrics (e.g., processor utilization, memory utilization), operating systems, hypervisor types, VM platform instance metadata (e.g., hostname, virtual operating system, kernel version, other software versions), processing environment information, client provided metadata, and/or other types of data not within the packets themselves. Other variations can also be implemented and other advantages may also be achieved while still taking advantage of the direct VM packet traffic monitoring techniques described herein FIG. 2 is a block diagram of an example embodiment for a client VM platform 104 that includes a client packet monitor application 110. The client packet monitor application 110 includes a network TAP 212, one or more filters 214, tool packet interface 220, and controller 216. The tool packet interface 220 also includes an encapsulation engine 222, and the controller 216 also includes configuration (CONFIG) data 218. The client VM platform 104 in part operates to provide one or more client applications 202 that generate and receive packets as client traffic 204 through a virtual network interface 206. The network interface 206 in turn communicates VM platform traffic 208 with other VM platforms operating within the same VM host server and/or with external VM platforms or systems through the network communication paths 160. As described herein, this VM platform traffic 208 includes client traffic 204, tool traffic 226 directed to one or more tool packet monitor applications 130, management traffic 228 communicated with the traffic management VM platform 150, and any other traffic for the client VM platform 104.

In operation, the client network TAP 212 for the client packet monitor application 110, which can be implemented as any desired virtual component that obtains copies of packets, obtains copies 224 of the client traffic 204 being communicated through the network interface 206. This traffic 224 is then processed by one or more filters 214 to identify traffic of interest for one or more network analysis tools. This traffic of interest is sent to the tool packet interface 220 which uses the encapsulation engine 222 to add encapsulation headers to the traffic of interest. As described below, these encapsulation headers are later used by the tool packet monitor applications 130 to identify the one or more tool applications to receive the traffic of interest. For example, the encapsulation engine 222 can add GRE (generic routing encapsulation) identifiers within a GRE header to each packet within the traffic of interest to identify one or more tool applications to receive that packet, and available tool applications can be assigned unique GRE identifiers. The resulting encapsulated tool traffic 226 is then provided back to the network interface 206 for communication out of the client VM platform 104 as part of the VM platform traffic 208.

It is noted that the client packet monitor application 110 can also have a separate network interface, if desired, such that the tool traffic 226 and the management traffic 228 are communicated through this separate network interface rather than through the network interface 206. It is further noted that management traffic 228 can be received from the traffic management VM platform 150 to provide the GRE identifiers for available tool applications and to provide filter configurations for the filters 214 to apply to the received client traffic 224. Further, the client packet monitor application 110 can also communicate information and/or requests back to the traffic management VM platform 150, as desired. The configuration information received through the management traffic 228 can also be stored as configuration data 218 by the controller 216, and the controller 216 can control the network TAP 212, the filters 214, and the tool packet interface 220 to operate according to management instructions received through the management traffic 228 within the VM platform traffic 208.

The encapsulation of the duplicated client traffic 224 by the encapsulation engine 222 allows for the copied packets to be delivered to destinations different from what is defined by the original packet envelope or headers. Once a packet has been captured by the network TAP 212, it is encapsulated with a header addressed directly to the receiving tool (e.g., GRE header). With this encapsulation header in place, the packet can be placed on the general network infrastructure and processed as normal within the network communication paths 160. The encapsulated packet will flow within the network to its intended tool VM platform based on this new envelope or header. This encapsulation allows for tool traffic flows to travel within the same network as data plane traffic, and no additional risks are therefore introduced with respect to existing security constraints and protections within the network infrastructure. Further, using the encapsulation headers, multiple different packet streams from multiple different client VM platforms 104, 106, 108, . . . can be forwarded to one or more destination tool VM platforms 124, 126, 128, . . . regardless of any security or architectural restrictions originally placed within the network infrastructure. As such, no additional or separate security management is required within the existing traffic monitoring environment for the visibility overlay provided by the disclosed embodiments.

Figure 3:
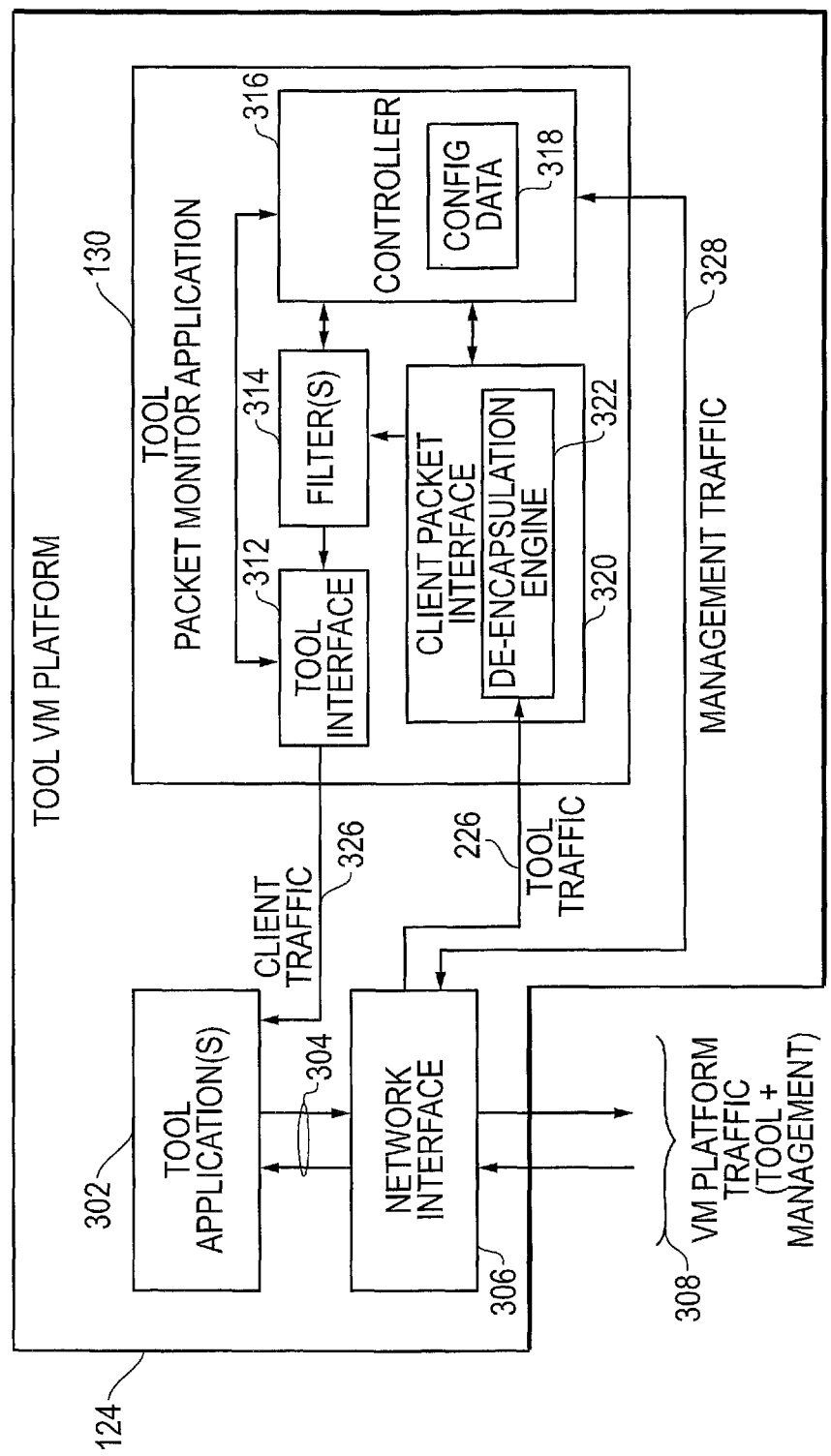
FIG. 3 is a block diagram of an example embodiment for a tool VM platform that includes a tool packet monitor application.

FIG. 3 is a block diagram of an example embodiment for a tool VM platform 124 that includes a tool packet monitor application 130. The tool packet monitor application 130 includes a tool interface 312, one or more filters 314, client packet interface 320, and controller 316. The client packet interface 320 also includes a de-encapsulation engine 322, and the controller 316 also includes configuration (CONFIG) data 318. The tool VM platform 124 in part operates to provide one or more tool applications 302 that analyze received packets within client traffic 326 from the tool packet monitor application 130. The tool applications 302 can also send and receive other traffic 304 directly through a network interface 306. The network interface 306 communicates VM platform traffic 308 with other VM platforms operating within the same VM host server and/or with external VM platforms or systems through the network communication paths 160. As described herein, this VM platform traffic 308 includes tool traffic 226 from one or more client packet monitor applications 110, management traffic 328 communicated with the traffic management VM platform 150, and any other traffic for the tool VM platform 124.

In operation, the client packet interface 320 receives the encapsulated tool traffic 226 communicated by the client packet monitor application 110 within one or more client VM platforms. The client packet interface 320 uses the de-encapsulation engine 322 to remove encapsulation headers from the traffic of interest within the encapsulated tool traffic 226. For example, the de-encapsulation engine 322 can remove GRE headers and use GRE identifiers within those header to identify one or more tool applications 302 to receive that packet. As indicated above, available tool applications 302 can be assigned unique GRE identifiers. The de-encapsulated traffic can also be processed by one or more filters 314 to further select traffic of interest and/or desired tool destinations for the traffic of interest. The filtered traffic of interest is then provided to the tool interface 312, and this resulting client traffic 326 is communicated to the one or more tool applications 302. Result information from the tool applications 302 can then be communicated through the network interface 306 as part of the VM platform traffic 308. The tool packet monitor application 130 can also have a separate network interface, if desired, such that the tool traffic 226 and the management traffic 328 are communicated through this separate network interface rather than through the network interface 306.

It is noted that management traffic 328 can be received from the traffic management VM platform 150 to provide the GRE identifiers for available tool applications 302 and to provide filter configurations for the filters 314. Further, the tool packet monitor application 130 can also communicate information and/or requests back to the traffic management VM platform 150, as desired. The configuration information received from the traffic management VM platform 150 can also be stored as configuration data 318 by the controller 316, and the controller 316 can control the client packet interface 320, the filters 314, and the tool interface 312 to operate according to management instructions received through the management traffic 328 within the VM platform traffic 308.

It is further noted that rather than use the tool packet monitor application 130 to terminate the encapsulation tunnel (e.g., GRE tunnel), the tool applications 302 can instead terminate the tunnel directly. However, this would likely lead to a less efficient implementation. Using the tool packet monitor application 130, the encapsulation tunnels providing packets from one or more client packet monitor applications 110 can be terminated more efficiently, and associated packet traffic can be aggregated down to a single stream of relevant traffic using the filters 314. As such, the tool packet monitor application 130 can remove processing and filtering requirements that would otherwise have to be implemented by the tool applications 302 with respect to termination and aggregation of the tool traffic 226 to form the resulting client traffic 326.

Looking back to FIGS. 2-3, it is noted that the filters 214/314 can rely upon various portions of the content of network packets to identify packets and to determine which tool application is to receive the packets. For example, filters 214/314 can be configured to rely upon data and/or information associated with any network layer header values or packet field contents to perform such actions. With respect to network layers, packet-based communications are often described in terms of seven communication layers under the ISO/OSI (International Standards Organization/Open Systems Interconnect) model: application layer (L7), presentation layer (L6), session layer (L5), transport layer (L4), network layer (L3), data link layer (L2), and physical layer (L1). Packet headers associated with any of these layers as well as packet data payload contents, therefore, can be used to the filters 214/314. For example, information pertinent to identifying a packet, such as source ID and destination ID and protocol type, is often found in one or more network layer headers. Packets also have various other identification fields and content information within them that may be matched and used to collect and aggregate information about packets and related packet flows. Still further, because the filters 214/314 are operating as part of the client packet monitor application 110/130 inside of the client VM platforms, the filters 214/314 can also rely upon non-packet content related information to determine tool destinations for the tool traffic 226. For example, information concerning application states, message states, operating system, and/or other information that is not within the packets themselves can be used by the filters 214/314. Thus, a wide variety of packet content and non-packet content related data and information can be identified and used by the filters 214/314.

Still further, it is noted that the configuration files 144 and the configuration data 218/318 described above can be stored within one or more data storage systems, and these data storage systems can be implemented using one or more non-transitory tangible computer-readable mediums such as FLASH memory, random access memory, read only memory, programmable memory devices, reprogrammable storage devices, hard drives, floppy disks, DVDs, CD-ROMs, and/or any other non-transitory data storage mediums. It is also noted that the VM host servers 102, 122, and 142 can be implemented using one or more processing devices programmed to provide the functionality described herein. For example, one or more processing devices, such as a processor, microcontroller, configurable logic device (e.g., CPLD (complex programmable logic device), FPGA (field programmable gate array)), and/or other processing device, can be programmed with software or other programming instructions to implement the functionality described herein. It is further noted that software or other programming instructions for such processing devices can be implemented as software or programming instructions embodied in one or more non-transitory computer-readable mediums (e.g., memory storage devices, FLASH memory, DRAM memory, reprogrammable storage devices, hard drives, floppy disks, DVDs, CD-ROMs, etc.) including software or programming instructions that when executed by the processing devices cause the processing devices to perform the processes, functions, and/or capabilities described herein for the VM host servers 102, 122, and 142 and their respective components.

Figure 4:
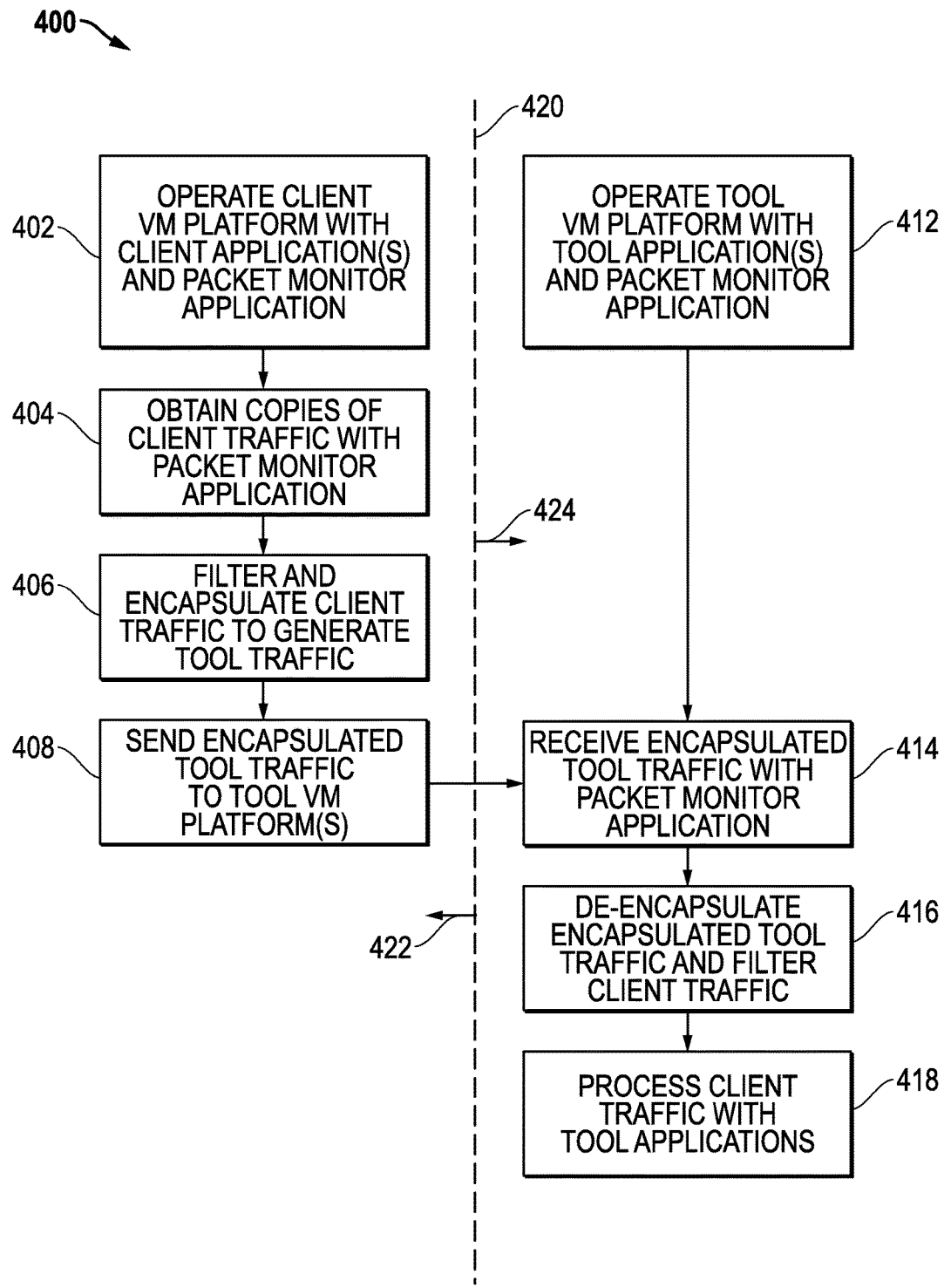
FIG. 4 is a process flow diagram of an example embodiment to identify and communicate encapsulated traffic from one or more client VM monitoring applications to one or more tool VM monitoring applications for subsequent de-encapsulation and processing.

FIG. 4 is a process flow diagram of an example embodiment 400 to identify and communicate encapsulated client traffic from one or more client VM monitoring applications to one or more tool VM monitoring applications for subsequent de-encapsulation and processing. Blocks to the left of dashed line 420 as indicated by arrow 422 correspond to example operation of a client VM platform 104, and blocks to the right of dashed line 420 as indicated by arrow 424 correspond to example operation of a tool VM platform 124. In block 402, a client VM platform 104 is operated within a virtual processing environment, and the client VM platform 104 includes one or more client applications 202 and a client packet monitor application 110. Concurrently, in block 412, a tool VM platform 124 is operated within a virtual processing environment, and the tool VM platform 124 includes one or more tool applications 302 and a tool packet monitor application 130. Looking now to block 404, copies of client traffic is obtained by the client packet monitor application 110. In block 406, the copied client traffic 224 is filtered and encapsulated to generate encapsulated tool traffic 226. The encapsulated tool traffic 226 is then sent to one or more tool VM platforms. In block 414, the encapsulated tool traffic is received by a packet monitor application 130 within a destination tool VM platform 124. In block 416, the encapsulated tool traffic 226 is de-encapsulated, and the resulting de-encapsulated traffic is filtered to generate client traffic 326. In block 418, the client traffic 326 is processed by one or more tool applications 302. It is noted that different and/or additional processes blocks could also be used.

FIG. 5 is a block diagram of an example embodiment for a VM host server 102/122/142. For the example embodiment depicted, the VM host server 102/122/142 includes one or more central processing units (CPUs) 502 or other processing devices programmed to provide a virtualization layer 112/132/152 including a plurality of virtual machine (VM) platforms 512, 514, . . . 516. The VM host server 102/122/142 also includes one or more network interface cards (NICs) 504, one or more input/output (I/O) ports 506, one or more non-volatile data storage systems 508, and one or more memory devices 503 coupled to communicate with each other through a system bus interconnect 510. In operation, virtualization layer 112/132/152 and the VM platforms (VM1, VM2 . . . VM(N)) 512, 514, . . . 516 run on top of a VM host operating system (OS) 114/134/154. For example, the VM host operating system 114/134/154, the virtualization layer 112/132/152, and the VM platforms 512, 514, . . . 516 can be initialized, controlled, and operated by the CPUs or processing devices 502 which load and execute software code and/or programming instructions stored in the data storage systems 508 to perform the functions described herein. The VM platforms 512, 514, . . . 516 can be client VM platforms, tool VM platforms, and/or traffic management VM platforms, as described above.

The virtualization layer 112/132/152 for the VM platforms described herein can be implemented using any desired virtualization layer, such as using a hypervisor or a container engine, that provides a virtual processing environment for the VM platforms. Using a hypervisor, as shown in FIG. 6A below, the client/tool packet monitor application 110/130 operates in addition to an application 602/612 on a guest operating system within one of the VM platforms 512/514 which in turn run on top of the hypervisor as the virtualization layer 112/132/152. Using a container engine, as shown in FIG. 6B below, the client/tool packet monitor application 110/130 operates along with applications 602/612 within a VM platform 512 that operates on top of the container engine. In this container engine embodiment, the applications 602/612 as well as the client/tool packet monitor application 110/130 are containers or other software components within a single VM platform 512. This container engine embodiment of FIG. 6B thereby provides a more streamlined technique for adding the client/tool packet monitor application 110/130 to a VM platform as the containers are relatively isolated from each other. For one embodiment, the container engine can be implemented as a DOCKER container for a Linux operating system configured to execute DOCKER containers, which are software components that are designed to be compatible with a Linux-based DOCKER container engine. Other variations could also be implemented.

FIG. 6A is a block diagram of an example embodiment 600 for a VM host server 102/122/132 that uses a hypervisor to provide a virtualization layer 112/132/152. For the embodiment 600, VM platforms 512 and 514 operate on top of hypervisor 112/132/152 which in turn operates on top of host operating system (OS) 114/134/154 which in turn operates on top of server hardware 116/136/156. For this embodiment 600, the VM host server 102/122/142 provides emulated hardware (HW) resources 608 and a guest operating system (OS) 606 for VM platform 512, and VM platform 512 executes binary code (BINS) or libraries (LIBS) 604 on top of the guest operating system 606 to provide a first application (APP A) 602. Similarly, the VM host server 102/122/142 provides emulated hardware (HW) resources 618 and a guest operating system (OS) 616 for VM platform 514, and VM platform 514 executes binary code (BINS) or libraries (LIBS) 614 on top of guest operating system 616 to provide a second application (APP B) 612. Thus, each of the VM platforms 512 and 514 have separate emulated hardware resources 608/618 and guest operating systems 606/616. For embodiment 600 as indicated above, a client/tool packet monitor application 110/130 when installed can operate within one of the VM platforms 512/514 on top of the guest OS 606/616 along with one of the application 602/612.

FIG. 6B is a block diagram of an example embodiment 650 for a VM host server 102/122/132 that uses a container engine to provide a virtualization layer 112/132/152. For the embodiment 650, VM platform 512 operates on top of container engine 112/132/152 which in turn operates on top of host operating system (OS) 114/134/154 which in turn operates on top of server hardware 116/136/156. For this embodiment 650, however, the VM platform 512 executes binary code (BINS) or libraries (LIBS) 604 directly on top of the container engine 112/132/152 to provide a first application (APP A) 602 and executes binary code (BINS) or libraries (LIBS) 614 directly on top of the container engine 112/132/152 to provide a second application (APP B) 612. As such, the container engine 112/132/152 provides a direct interface to the host operating system 114/134/154 without need for emulated hardware (HW) resources 608/618 and/or guest operating systems 606/616 as used in FIG. 6A. For embodiment 650 as indicated above, a client/tool packet monitor application 110/130 when installed can operate along with the other applications 602/612 on top of the container engine 112/132/152 within the VM platform 512.

Looking now to FIGS. 7A-B and 8-10, it is noted that the traffic management VM platform 150 can operate to configure client VM platforms that are initiated to accommodate additional client resource needs. Using configuration information provided by the traffic management VM platform 150, new client VM platforms as well as new tool VM platforms can be added to the traffic monitoring environment and automatically configured for operation within the network visibility and monitoring system embodiments disclosed herein. Further, the controller 216/316 within the monitor applications 110/130 can be configured to maintain a persistent connection to the centralized traffic management VM platform 150. User configuration can then be implemented through traffic management VM platform 150, and traffic management platform 150 can then push control instructions through management traffic 228/328. In addition to managing configuration and traffic flow, the traffic management VM platform 150 can also respond to dynamic changes in the numbers of client VM platforms and can dynamically adjust numbers of tool VM platforms based upon capacity needs.

FIG. 7A is a block diagram of an example embodiment 700 for an initial monitoring environment. A source group 702 of VM platforms includes a single client VM platform 104 that is providing tool traffic 226 to a single tool VM platform 124 within a destination group 704. As described herein, the tool traffic 226 is generated by a client packet monitor application 110 operating as part of the client VM platform 104 to monitor, filter, and output tool traffic 226 for receipt by the tool VM platform 124. The tool VM platform 124 then receives and processes this tool traffic 226 using the tool packet monitor application 130. As also described herein, the traffic management VM platform 150 communicates with the client VM platform 104 and the tool VM platform 124 to help configure, manage, and/or otherwise control their operations.

FIG. 7B is a block diagram of an example embodiment 750 for a monitoring environment where additional client processing capacity 751 has been added to the embodiment of FIG. 7A. For the example embodiment 750 depicted, the source group 702 of VM platforms now includes additional client VM platforms 752, 754, and 756 in addition to client VM platform 104. As such, in addition to tool traffic 226, additional tool traffic 753, 755, and 757 is being provided to the VM platform 124 within a destination group 704. As described herein, the tool traffic is generated by a client packet monitor application 110 operating as part of each of the client VM platforms 104, 752, 754, and 756 to monitor, filter, and output tool traffic for receipt by the tool VM platform 124. The tool VM platform 124 then receives and processes this tool traffic 226/753/755/757 using the tool packet monitor application 130. As also described herein, the traffic management VM platform 150 communicates with the client VM platforms 104, 752, 754, and 756 as well as the tool VM platform 124 to help configure, manage, and/or otherwise control their operations. For example, when each of the additional client VM platforms 752, 754, and 756 are initiated, one or more monitor configuration files 144 from the traffic management VM platform 150 are used to configure the new client VM platform 752, 754, and/or 756.

FIG. 8 is a process flow diagram of an example embodiment 800 where the traffic management VM platform 150 is used to provide configuration of client packet monitor applications within new client VM platforms. In block 802, a new client VM platform is initiated. In block 804, a determination is made whether an existing configuration is to be used. If "YES," then flow passes to block 806 where a copy of an existing configuration is sent from the traffic management VM platform 150 to the new client VM platform. As described above, one or more prior monitor configuration files 144 can be stored by the traffic management VM platform 150, and these prior monitor configuration files 144 can include parameters, settings, and/or other information that can be used as configuration data to configure a client packet monitor application 110 within a new client VM platform 752, 754, and 756. If the determination in block 804 is "NO," then a new configuration is generated for the new client VM platform by the traffic management VM platform 150. In block 812, this new tap configuration is sent to the new client VM platform 752, 754, and 756. Block 808 is then reached from block 806 or block 812. In block 808, a client packet monitor application 110 is run within the new client platform 104 using the configuration information received from the traffic management VM platform 150. Other variations could also be implemented.

As indicated above, the traffic management VM platform 150 can also operate to initiate and/or configure new tool VM platforms when additional tool processing capacity is needed based upon additional client traffic. For example, as the number of client VM platforms scales out, an existing tool VM platform may find itself serving an increasing amount of traffic. In order to cope with this, additional tool VM platforms can be initiated and operated to add tool capacity. The traffic management VM platform 150 can then send management traffic to the client VM platforms and the tool VM platforms to rebalance traffic among the available resources. The load balancing that is applied by the traffic management VM platform 150 can be relatively minimal or can be relatively complex depending upon the load balancing desired for the visibility and monitoring environment.

Now looking to FIG. 9, a block diagram is provided of an example embodiment 900 for a monitoring environment where additional tool processing capacity 901 has been added. For the example embodiment 900 depicted, the source group 702 of VM platforms includes client VM platforms 104, 752, 754, and 756. As such, tool traffic 226, 753, 755, and 757 is being generated and provided to the destination group 704. For embodiment 900, it is assumed that a determination was made that tool VM platform 124 did not have the capacity to process all of this tool traffic. As such, an additional tool VM platform 902 was initiated and configured, for example, using the traffic management VM platform 150. Further, the traffic management VM platform 150 also sent management information to the client packet monitors 110 operating in client VM platforms 754 and 756 so that tool traffic 755 and 757 is now sent to the new tool VM platform 902. The tool VM platform 124 then receives and processes tool traffic 226 and 753 using the tool packet monitor application 130, and the new tool VM platform 902 receives and processes tool traffic 755 and 757 using a tool packet monitor application 130. As also described herein, the traffic management VM platform 150 communicates with the client VM platforms 104, 752, 754, and 756 as well as the tool VM platforms 124 and 902 to help configure, manage, and/or otherwise control their operations. For example, when the additional tool VM platform 902 is initiated, one or more monitor configuration files 144 from the traffic management VM platform 150 are used to configure to the new tool VM platform 902.

FIG. 10 is a process flow diagram of an example embodiment 1000 where tool VM platforms are adjusted based upon current capacity needs. In block 1002, a traffic level for one or more existing tool VM platforms is determined. In block 1004, a determination is made whether or not an overload condition exists. If "YES," then flow passes to block 1006 where a new tool VM platform is added. In addition, the traffic management VM platform 150 can also be used to provide configuration information for the new tool VM platform and a new tool packet monitor application 130 within the new tool VM platform. If the determination in block 1004 is "NO," then flow passes to block 1008 where a determination is made whether an excess capacity condition exists. If "NO," then flow passes back to block 1002. If "YES," then flow passes to block 1010 where a tool VM platform is removed from operation. It is noted that the traffic management VM platform 150 can make the determinations of traffic levels and can provide management instructions that cause additional tool VM platforms to be added or existing tool VM platforms to be removed. Other variations could also be implemented.

It is noted that the functional blocks, systems, devices, and/or circuitry described herein can be implemented using hardware, software, or a combination of hardware and software. In addition, one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) executing software and/or firmware instructions can be used to implement the disclosed embodiments. It is further understood that one or more of the operations, tasks, functions, or methodologies described herein can be implemented, for example, as software, firmware and/or other program instructions that are embodied in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) and that are executed by one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) to perform the operations, tasks, functions, or methodologies described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method to monitor packet traffic, comprising:
generating network packets using one or more client applications operating within each of a plurality of client virtual machine (VM) platforms operating within a first VM host server;
at each of a plurality of client packet monitor applications, at least one client packet monitor application operating within each of the plurality of client VM platforms:
obtaining copies of network packets for the one or more client applications operating within that client VM platform to generate network packet copies;
encapsulating the network packet copies with encapsulation headers to form encapsulated network packet copies for an encapsulation tunnel; and
forwarding the encapsulated network packet copies through the encapsulation tunnel to at least one tool VM platform operating within a second VM host server;
wherein each of the plurality of client packet monitor applications uses a separate encapsulation tunnel to forward its encapsulated network packet copies.

2. The method of claim 1, further comprising using each of the client packet monitor application to filter the network packet copies with one or more packet filters prior to the encapsulating.

3. The method of claim 2, further comprising receiving configuration information for the one or more packet filters from a traffic management VM platform operating within a third VM host server.

4. The method of claim 1, further comprising receiving the encapsulated network packet copies with a plurality of tool VM platforms operating within the second VM host server.

5. The method of claim 4, further comprising, for each of the plurality of tool VM platforms, using a tool packet monitor application operating within the tool VM platform to de-encapsulate the encapsulated network packet copies to form client traffic and to forward the client traffic to one or more tool applications operating within the tool VM platform.

6. The method of claim 1, wherein the encapsulating comprises encapsulating the network packet copies with GRE (general routing encapsulation) headers.

7. The method of claim 6, wherein the GRE headers include GRE identifiers that identify destination tool applications within the at least one tool VM platform to receive the client traffic after the de-encapsulating.

8. The method of claim 7, further comprising receiving GRE identifiers from a traffic management VM platform operating within a third VM host server.

9. The method of claim 8, wherein a single common VM server serves as the first VM server, the second VM server, and the third VM server.

10. The method of claim 1, further comprising operating a first hypervisor within the first VM host server to provide a first virtualization layer for the plurality of client VM platforms and a corresponding first guest operating system, and operating a second hypervisor within the second VM host server to provide a second virtualization layer for the at least one tool VM platform and a corresponding second guest operating system.

11. The method of claim 1, further comprising operating a first container engine within the first VM host server to provide a first virtualization layer for the plurality of client VM platforms without a corresponding guest operating system, and operating a second container engine within the second VM host server to provide a second virtualization layer for the at least one tool VM platform without a corresponding guest operating system.

12. The method of claim 1, further comprising initiating a new client VM platform operating within the first VM host server, and configuring a client packet monitor application for the new client VM platform using configuration information received from a traffic management VM platform.

13. The method of claim 1, further comprising initiating a new tool VM platform operating within the second VM host server, and configuring a tool packet monitor application for the new tool VM platform using configuration information received from a traffic management VM platform.

14. The method of claim 1, further comprising sending forwarding instructions to each of the client packet monitor applications to determine how encapsulated network packets copies are forwarded to a plurality of different tool VM platforms operating within the second VM host server.

15. A system to monitor packet traffic, comprising:
a first virtual machine (VM) host server configured to host one or more client applications operating within each of a plurality of client virtual machine (VM) platforms, the one or more client applications being configured to generate network packets; and
a second VM host server configured to host one or more tool VM platforms;
wherein the first VM host server is further configured to host a plurality of client packet monitor applications, at least one client packet monitor application being configured to operate within each of the plurality of client VM platforms in order to obtain copies of network packets for the one or more client applications operating within that client VM platform to generate network packet copies, to encapsulate the network packet copies with encapsulation headers to form encapsulated network packet copies for an encapsulation tunnel, and to forward the encapsulated network packet copies through the encapsulation tunnel to the at least one tool VM platform; and
wherein each of the plurality of client packet monitor applications uses a separate encapsulation tunnel to forward its encapsulated network packet copies.

16. The system of claim 15, wherein each of the client packet monitor application is further configured to filter the network packet copies with one or more packet filters prior to the encapsulating.

17. The system of claim 16, further comprising a third VM server configured to host a traffic management VM platform, and wherein configuration information for the one or more packet filters comprises information received from the traffic management VM platform.

18. The system of claim 15, wherein the second VM server is configured to host a plurality of tool VM platforms configured to receive the encapsulated network packet copies.

19. The system of claim 18, wherein a tool packet monitor application is configured to operate in each of the tool VM platforms and to de-encapsulate the encapsulated network packet copies to form client traffic and to forward the client traffic to one or more tool applications operating within the tool VM platform.

20. The system of claim 15, wherein encapsulation headers for the network packet copies comprise GRE (general routing encapsulation) headers.

21. The system of claim 20, wherein the GRE headers include GRE identifiers that identify destination tool applications within the at least one tool VM platform to receive the client traffic after de-encapsulation.

22. The system of claim 21, further comprising a third VM server configured to host a traffic management VM platform, and wherein the GRE identifiers comprise GRE identifiers received from the traffic management VM platform.

23. The system of claim 22, wherein a single common VM server serves as the first VM server, the second VM server, and the third VM server.

24. The system of claim 15, wherein the first VM host server is further configured to host a first hypervisor to provide a first virtualization layer for the plurality of client VM platforms and a corresponding first guest operating system, and wherein the second VM host server is further configured to host a second hypervisor to provide a second virtualization layer for the at least one tool VM platform and a corresponding second guest operating system.

25. The system of claim 15, wherein the first host VM server is further configured to host a first container engine to provide a first virtualization layer for the plurality of client VM platforms without a corresponding guest operating system, and wherein the second host VM server is further configured to host a second container engine to provide a second virtualization layer for the at least one tool VM platform without a corresponding guest operating system.

26. The system of claim 15, wherein the first VM host server is configured to initiate a new client VM platform having a client packet monitor application using configuration information received from a traffic management VM platform.

27. The system of claim 15, wherein the second VM host server is further configured to initiate a new tool VM platform having a tool packet monitor application using configuration information received from a traffic management VM platform.

28. The system of claim 15, wherein the client packet monitor applications are configured to receive forwarding instructions to determine how encapsulated network packets copies are forwarded to a plurality of different tool VM platforms operating within the second VM host server.

29. The method of claim 1, wherein a plurality of tool applications operate within the at least one tool VM platform, each of the plurality of tool applications being assigned a unique identifier.

30. The method of claim 29, further comprising at each of the client packet monitor applications including the unique identifiers within the encapsulation headers, and at the at least one tool VM platform using the unique identifiers to determine which of the plurality of tool applications receive the client traffic after the de-encapsulating.

31. The system of claim 1, wherein a plurality of tool applications are configured to operate within the at least one tool VM platform, each of the plurality of tool applications being assigned a unique identifier.

32. The system of claim 31, wherein each of the client packet monitor applications is configured to include the unique identifiers within the encapsulation headers, and the at least one tool VM platform is configured to use the unique identifiers to determine which of the plurality of tool applications receive the client traffic after the de-encapsulating.

* * * * *